(12) United States Patent
Narita (10) Patent No.: US 12,026,565 B2
(45) Date of Patent: Jul. 2, 2024

(54) IMAGE PROCESSING APPARATUS THAT PRINTS INFORMATION INDICATED BY LINK DESTINATION INFORMATION, METHOD OF CONTROLLING SAME, AND STORAGE MEDIUM

(71) Applicant: CANON KABUSHIKI KAISHA, Tokyo (JP)

(72) Inventor: Tateki Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/241,439

(22) Filed: Sep. 1, 2023

(65) Prior Publication Data
US 2024/0078399 A1    Mar. 7, 2024

(30) Foreign Application Priority Data
Sep. 5, 2022   (JP) .................................. 2022-140846

(51) Int. Cl.
*G06K 15/00*   (2006.01)
*G06K 15/02*   (2006.01)
*H04N 1/00*    (2006.01)

(52) U.S. Cl.
CPC ..... *G06K 15/1814* (2013.01); *H04N 1/00427* (2013.01); *H04N 1/00639* (2013.01)

(58) Field of Classification Search
CPC .............. G06K 15/1814; H04N 1/00427
See application file for complete search history.

(56) References Cited

U.S. PATENT DOCUMENTS

| | | | | |
|---|---|---|---|---|
| 2005/0068581 A1* | 3/2005 | Hull | ......................... | G06F 3/122 358/1.15 |
| 2006/0056873 A1* | 3/2006 | Kimura | ................ | G03G 15/502 399/81 |
| 2009/0097698 A1* | 4/2009 | Kasahara | .............. | G06F 21/608 382/100 |
| 2011/0292442 A1* | 12/2011 | Nakagawa | ......... | H04N 1/32101 358/1.15 |
| 2013/0083348 A1* | 4/2013 | Yamada | .................. | G06F 3/121 358/1.14 |
| 2023/0385358 A1* | 11/2023 | Yoon | ....................... | G06F 16/95 |

FOREIGN PATENT DOCUMENTS

JP    2006085376 A    3/2006

* cited by examiner

*Primary Examiner* — Benjamin O Dulaney
(74) *Attorney, Agent, or Firm* — ROSSI, KIMMS & McDOWELL LLP

(57) ABSTRACT

An image processing apparatus that performs image processing of document data including link destination information converted to a code data image. The document data is displayed, and in a case where the code data image is detected from the document data, link destination information is extracted from the detected code data image. Whether or not to set each of the document data and information indicated by the link destination information as an object to be printed is selected by a user. When a print instruction is received from a user, the document data is printed in a case where the document data has been selected as the object to be printed, and the information indicated by the link destination information is printed in a case where the information indicated by the link destination information has been selected as the object to be printed.

7 Claims, 8 Drawing Sheets

IMAGE PROCESSING APPARATUS THAT PRINTS INFORMATION INDICATED BY LINK DESTINATION INFORMATION, METHOD OF CONTROLLING SAME, AND STORAGE MEDIUM

BACKGROUND OF THE INVENTION

Field of the Invention

The present invention relates to an image processing apparatus, a method of controlling the same, and a storage medium, and more particularly to an image processing apparatus that performs image processing of document data indicated by link destination information, such as a Uniform Resource Locator (URL) converted to a code data image, a method of controlling the same, and a storage medium.

Description of the Related Art

In general, an amount of information which can be described in each page in document data has a limitation, and hence in most cases, as for detailed information and reference information, which are large in the amount of information, only link destination information (URL) using the Internet for such information is described. Further, the link destination information is described in document data in a form converted to a code data image formed by a one-dimensional code (such as a barcode) or two-dimensional code (such as a QR code (registered trademark)). However, in a case where a code data image is used, a user cannot access a Web page indicated by the link destination information without performing troublesome operations of printing the document data using a printer, reading the code data image from the printed sheet using e.g. a camera, and causing analysis software to analyze the data.

On the other hand, multifunction peripherals having a communication function using e.g. a network or a fax line receive document data in the form of page description language (PDL), fax, or the like, and generate and print a received image. Further, some multifunction peripherals have a preview function for holding a received image in a storage device without immediately printing the received image and performing preview display of the image on a screen of the multifunction peripheral or of an external apparatus (such as a personal computer (PC)) as a Remote User Interface (RUI) before printing the received image. By using the preview function, the user can confirm the contents of received image, select only necessary data out of the contents of the received image, and execute printing.

In a case where a code data image is included in the received image, it can be considered that the user desires to confirm and print not only the received image, but also a Web page indicated by link destination information obtained by analyzing the code data image. In view of this, some multifunction peripherals are configured to analyze, in a case where a code data image is included in a received image, the code data image, and display, when displaying the received image as a preview, link destination information obtained by this analysis in accompaniment with the received image, on the RUI. By clicking the link destination information displayed on the RUI, the user can cause a Web page indicated by the link destination information to be displayed on a Web browser of the external apparatus. With this, the user can easily browse and display the Web page indicated by the link destination information on the external apparatus as the RUI of the multifunction peripheral, without performing the above-mentioned troublesome operations using the printer, the camera, analysis software, and so forth.

In Japanese Laid-Open Patent Publication (Kokai) No. 2006-85376, there has been proposed a technique of storing URLs of Web pages browsed and displayed on a multifunction peripheral using the above-described method, displaying the URLs in a list on the RUI of the multifunction peripheral, acquiring Web pages of a plurality of URLs selected by a user from the list, and printing the Web pages by combining them.

However, to print the received image being displayed as the preview and the Web page indicated by the link destination information displayed in accompaniment with the received image being previewed, the user is required to perform respective different print operations. For example, when printing the received image, the user is required to click a print button on the preview screen, set print settings for the received image, and execute printing of the received image. Further, when printing the Web page indicated by the link destination information, the user is required to click the link destination information (URL) on the preview screen to display the Web page on the multifunction peripheral, select a printer from a print menu of the Web browser, perform setting of print settings for the Web page, and execute printing of the Web page.

Thus, although the received image and the link destination information are displayed on the same preview screen, to print the received image and print the Web page indicated by the link destination information, the user is required to perform setting of print settings and execute printing, on the different screens, respectively, which complicates the user's operations.

SUMMARY OF THE INVENTION

The present invention provides a mechanism that makes it possible to perform printing of document data and printing of information indicated by link destination information extracted from a code data image included in the document data, by a simplified user operation.

In a first aspect of the present invention, there is provided an image processing apparatus that performs image processing of document data including link destination information converted to a code data image, including a first print unit configured to print the document data, a second print unit configured to acquire information indicated by the link destination information and print the acquired information, a display unit configured to display the document data, an extraction unit configured to extract, in a case where the code data image is detected from the document data, link destination information from the detected code data image, a printing object reception unit configured to receive user selection on whether or not to set each of the document data and the information indicated by the link destination information as an object to be printed, a print instruction reception unit configured to receive a print instruction for printing the object to be printed from a user, and a print control unit configured to cause, when the print instruction is received, the first print unit to print the document data in a case where the document data has been selected by the user as the object to be printed, and cause the second print unit to print the information indicated by the link destination information in a case where the information indicated by the link destination information has been selected by the user as the object to be printed.

In a second aspect of the present invention, there is provided a method of controlling an image processing apparatus that performs image processing of document data including link destination information converted to a code data image, including displaying the document data, extracting, in a case where the code data image is detected from the document data, link destination information from the detected code data image, receiving user selection on whether or not to set each of the document data and the information indicated by the link destination information as an object to be printed, receiving a print instruction for printing the object to be printed from a user, and printing, when the print instruction is received, the document data in a case where the document data has been selected by the user as the object to be printed, and printing the information indicated by the link destination information in a case where the information indicated by the link destination information has been selected by the user as the object to be printed.

According to the present invention, it is possible to perform printing of document data and printing of information indicated by link destination information extracted from a code data image included in the document data, by a simplified user operation.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

The embodiments of the present invention will be described in detail below. Note that the components described in the following embodiments are described only by way of example, and are by no means intended to limit the scope of the present invention to them alone.

Figure 1:
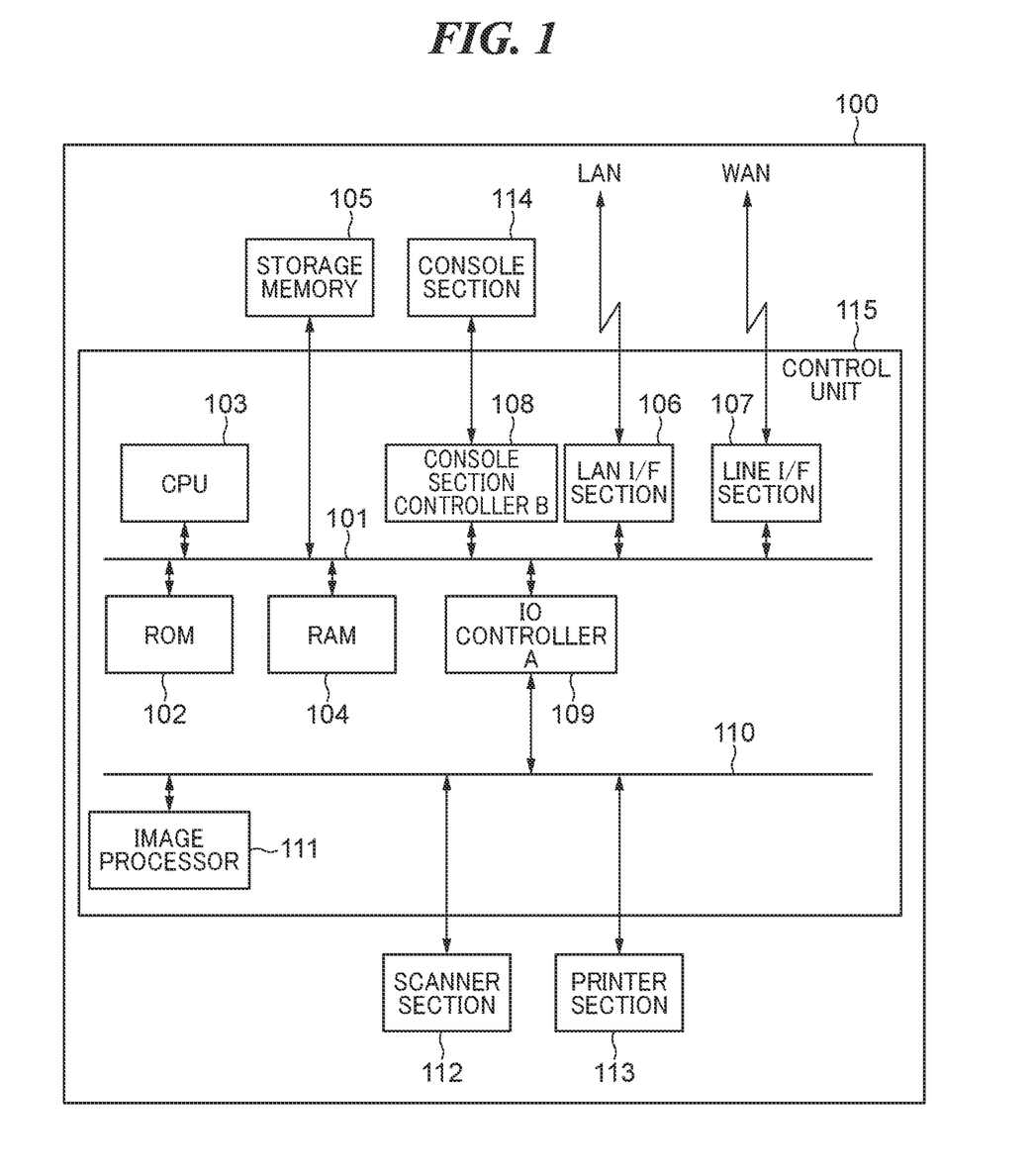
FIG. 1 is a block diagram showing a hardware configuration of an image processing apparatus according to a first embodiment of the present invention.

FIG. 1 is a block diagram showing a hardware configuration of an image processing apparatus 100 according to a first embodiment. Unless otherwise specifically noted, the present invention can be applied even if the image processing apparatus 100 is a single apparatus or a system formed by a plurality of apparatuses insofar as the functions of the present invention can be executed.

Referring to FIG. 1, the image processing apparatus 100 includes a control unit 115, a storage memory 105, a console section 114, a scanner section 112, and a printer section 113.

The control unit 115 includes a read only memory (ROM) 102, a central processing unit (CPU) 103, a random access memory (RAM) 104, a local area network (LAN) interface section 106, a line interface section 107, a console section controller B 108, and an input output (IO) controller A 109, which are interconnected via a system bus 101. Further, in the control unit 115, the IO controller A 109 is also connected to an image processor 111 via an image bus 110 which transfers image data at high speed.

The ROM 102 stores a boot program of the system of the image processing apparatus 100. Further, system software embodying the present invention is stored in the ROM 102 or the storage memory 105 and is executed by the CPU 103.

The RAM 104 is a system work memory area for the CPU 103 that executes the system software, and is also used as an image memory for temporarily storing image data when processing the image data.

The storage memory 105 is used as an internal storage of the image processing apparatus 100 and stores image data read by the scanner section 112, the system software, and so forth. The storage memory 105 is implemented by a hard disk drive (HDD) or a solid state drive (SSD).

The LAN interface section 106 is an interface section for connecting to a LAN and inputs and outputs information (such as a received image) to and from devices connected to the LAN. The line interface section 107 is an interface section for connecting to a wide area network (WAN) and inputs and outputs information (such as a received image) to and from devices connected to the WAN.

The IO controller A 109 is a bus bridge that connects between the system bus 101 and the image bus 110 and converts the data structure of the system bus 101. The image bus 110 is implemented by a PCI bus or a general-purpose bus, such as an IEEE 1394 bus or a PCIEx bus.

The image processor 111 is connected to the scanner section 112 and the printer section 113 which are image inputting and outputting devices via the image bus 110, to perform synchronous-to-asynchronous or asynchronous-to-synchronous conversion of image data. The image processor 111 is formed by a plurality of application specific integrated circuits (ASICs) that perform image processing, such as resolution conversion, compression-decompression, and binary multi-value conversion, on input image data and output image data.

The console section controller B 108 is a user interface (UI) section interfacing with the console section 114, and outputs image data to be displayed on the console section 114 to the console section 114. Further, the console section controller B 108 plays a role of notifying the CPU 103 of information input to the console section 114 by a user of this system. That is, the console section controller B 108 is an interface section used by the system software to control the console section 114 equipped with a display device, a key pad device, a card reader device, and so forth. In the present embodiment, the console section 114 is comprised of an LCD touch panel, and interprets and displays VGA signals output from the console section controller B 108.

The scanner section 112 has an automatic document feeder (ADF) scanner and a pressure plate scanner. The ADF scanner can continuously convey and read a plurality of originals but cannot convey and read originals depending on an original size or sheet type (material and basis weight), and hence such originals are read using the pressure plate scanner.

The printer section 113 has a plurality of sheet discharge trays and further can perform finishing, such as stapling.

Figure 2:
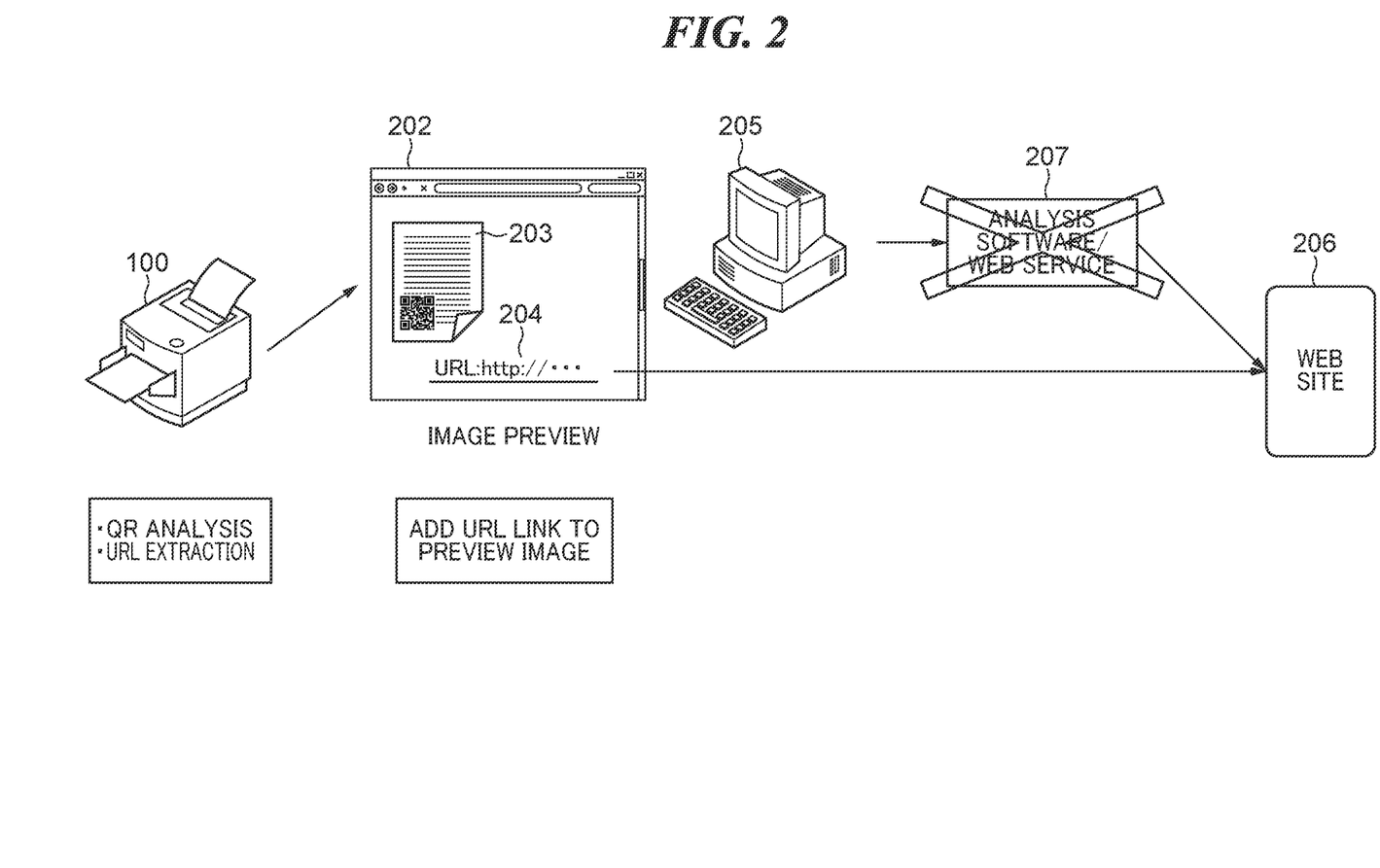
FIG. 2 is a diagram useful in explaining a conventional preview screen displayed on a RUI of the image processing apparatus.

FIG. 2 is a diagram useful in explaining a conventional preview screen displayed on a RUI of the image processing apparatus 100.

Note that the components described with reference to FIG. 1 are denoted by the same reference numerals, and redundant description is omitted. Further, although the following description will be given of a case where the image processing apparatus 100 has a RUI function, the image processing apparatus 100 can have a local user interface (LUI) function for displaying images and information on the console section 114.

The image processing apparatus 100 has a preview function of displaying a preview screen formed by information, an image, and/or the like, which is to be printed using a Web browser of a PC 205 as a RUI 202. Further, the image processing apparatus 100 holds data related to screen configuration and contents of display, described in Hyper Text Markup Language (HTML) or the like, in the ROM 102 or the storage memory 105.

The CPU 103 of the image processing apparatus 100 transmits the data related to screen configuration and contents of display in response to a request from the PC 205 using one of windows of the Web browser of the PC 205 connected via a network as the RUI 202. Further, the CPU 103 (extraction unit) of the image processing apparatus 100 has a function of analyzing a code data image (QR code in the present embodiment) in a received image 203 acquired from the outside via the LAN or the WAN and extracting link destination information 204 therefrom. In the preview function, the CPU 103 of the image processing apparatus 100 transmits information on a preview screen including the received image 203 and the link destination information 204 to the PC 205 and displays the preview screen on the RUI 202. The link destination information 204 is displayed in URL link format, and hence the PC 205 is not required to analyze the QR code in the image using e.g. external QR code analysis software 207. Therefore, when the user clicks the link destination information 204 displayed on the RUI 202, the PC 205 starts another window of the Web browser and displays a screen of a Web site 206 (Web page 310a) indicated by the link destination information 204, on this window.

Although in the present embodiment, a case where document data including a QR code displayed on the RUI 202 is an image received from the outside will be described, the image processing apparatus 100 itself can generate image data including a QR code as the document data according to a user operation or the like. Further, although in the present embodiment, a case where the image processing apparatus 100 has the RUI function will be described, the image processing apparatus 100 itself can have a Web browser and a LUI function for displaying information and an image on the Web browser on the console section 114.

Figure 3:
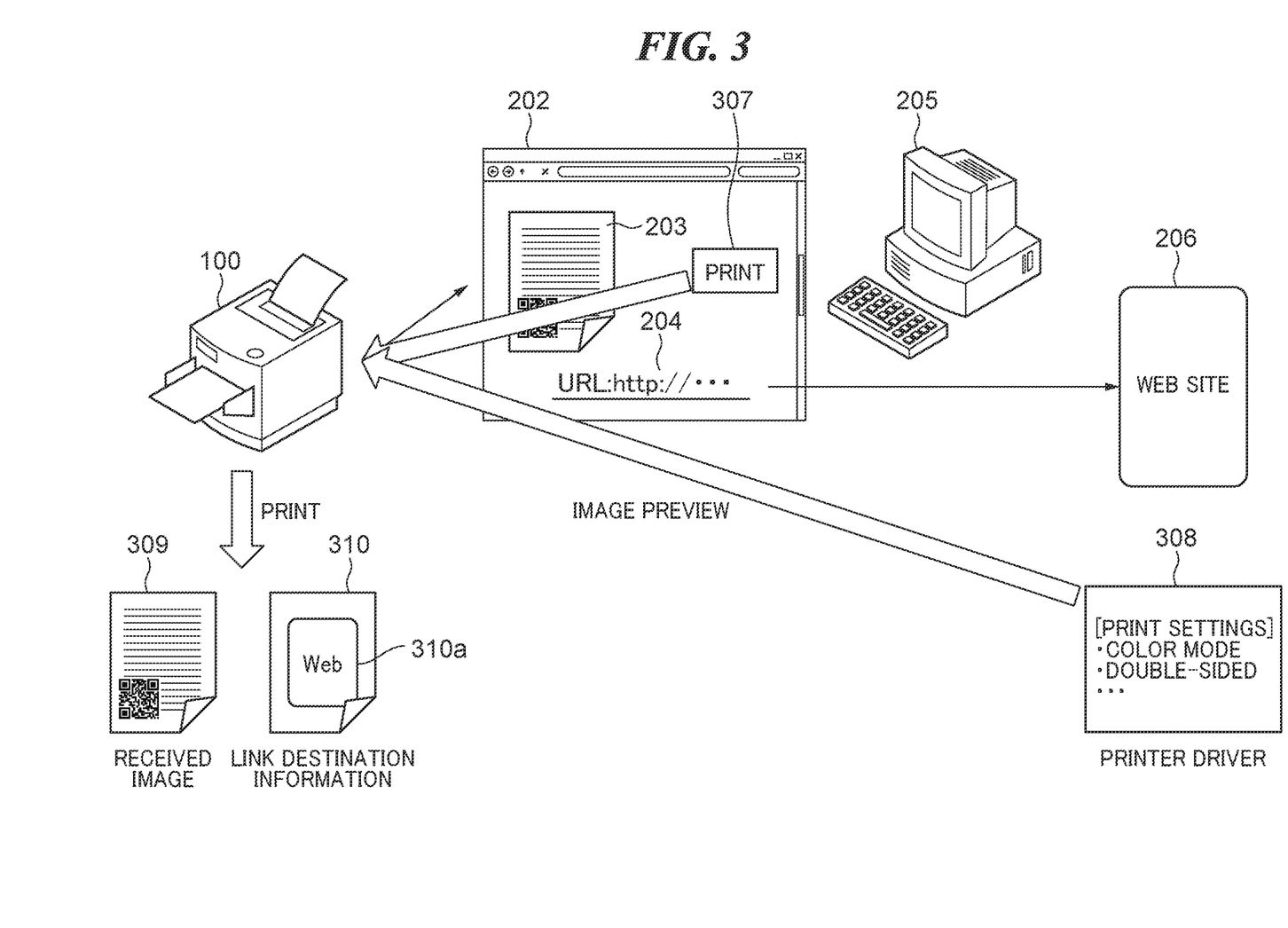
FIG. 3 is a diagram useful in explaining a conventional method of printing a received image and a Web page specified by link destination information, which are displayed on the preview screen appearing in FIG. 2.

FIG. 3 is a diagram useful in explaining a conventional method of printing the received image 203 displayed on the preview screen appearing in FIG. 2 and the Web page 310a indicated by the link destination information 204.

Note that the components described with reference to FIGS. 1 and 2 are denoted by the same reference numerals, and redundant description is omitted.

In the PC 205, when the user clicks the received image 203 on the RUI 202 appearing in FIG. 2, a print button 307 is additionally disposed on the preview screen of the RUI 202.

When the user clicks the print button 307, the CPU 103 of the image processing apparatus 100 executes printing of the received image 203, and a printed sheet 309 of the received image 203 is output. Further, to print the Web site 206 displayed in response to the operation of clicking the link destination information 204, when the user selects a printer used for printing, from a print menu on the Web browser, the PC 205 starts a printer driver 308 for the selected printer. This enables the user to set print settings for printing the Web site 206 and execute the printing. Upon receipt of the print data from the printer driver 308, the CPU 103 of the image processing apparatus 100 executes printing by the printer section 113, and a printed sheet 310 of the Web page 310a indicated by the link destination information 204 is output.

Figure 4:
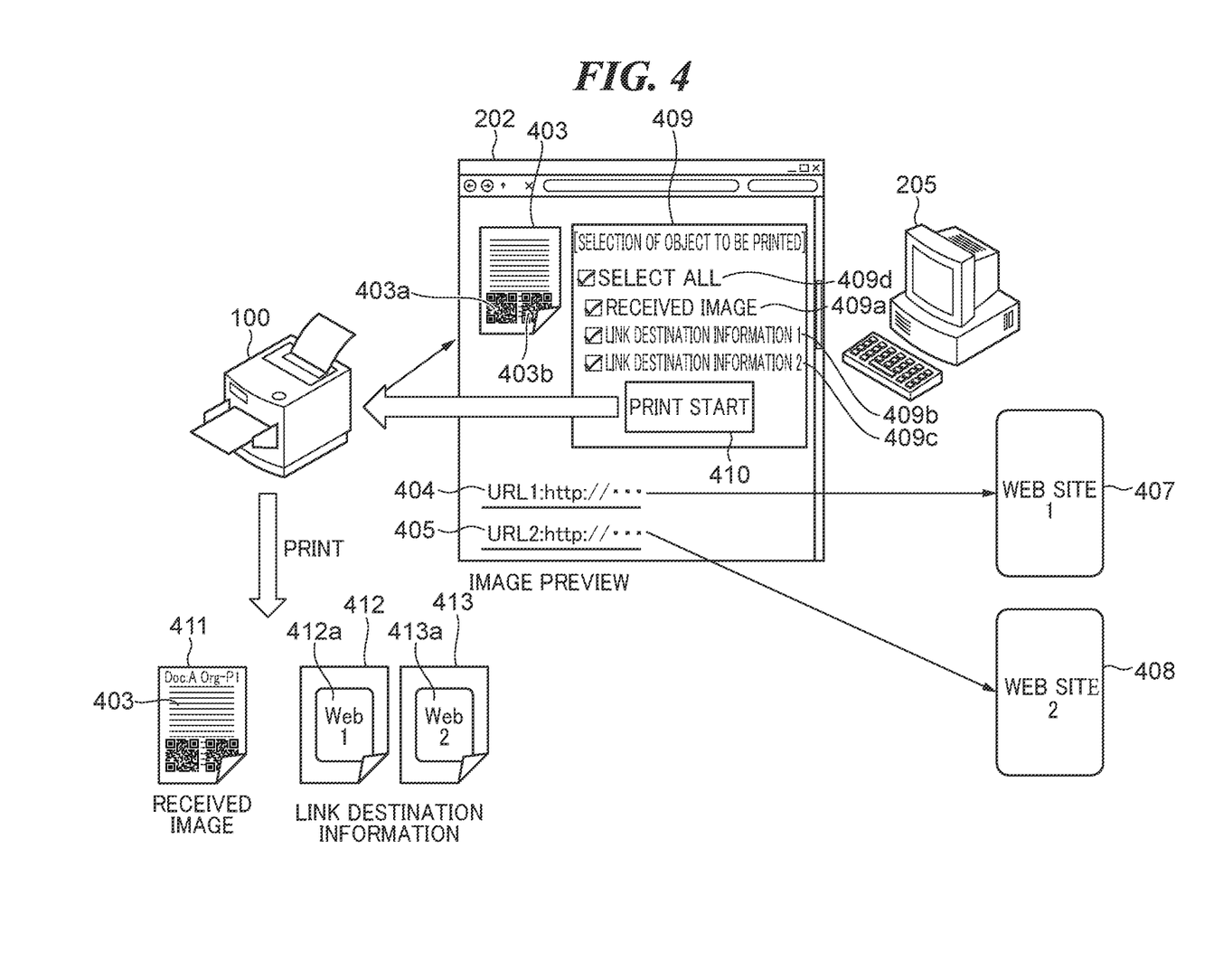
FIG. 4 is a diagram useful in explaining a preview screen according to the first embodiment, which is displayed on the RUI of the image processing apparatus.

FIG. 4 is a diagram useful in explaining a preview screen according to the first embodiment, which is displayed on the RUI 202 of the image processing apparatus 100.

Note that the components described with reference to FIGS. 1 and 2 are denoted by the same reference numerals, and redundant description is omitted. Further, the following description will be given of a case where the image received by the image processing apparatus 100 is a received image 403 including a plurality of QR codes (QR codes 403a and 403b in the illustrated example) appearing in FIG. 4.

The CPU 103 of the image processing apparatus 100 analyzes the QR codes 403a and 403b in the received image 403, extracts link destination information 404 from the QR code 403a, and extracts link destination information 405 from the QR code 403b. In the preview function, the CPU 103 of the image processing apparatus 100 transmits information on a preview screen including the received image 403 and the link destination information items 404 and 405 to the PC 205 for display on the RUI 202. Here, the link destination information items 404 and 405 are each displayed in URL link format. When the user clicks the link destination information 404 displayed on the RUI 202, the PC 205 starts another window of the Web browser and displays a screen (Web page 412a) of a Web site 407 indicated by the link destination information 404 on this window. Similarly, when the user clicks the link destination information 405 displayed on the RUI 202, the PC 205 starts another window of the Web browser and displays a screen (Web page 413a) of a Web site 408 indicated by the link destination information 405 on this window.

The CPU 103 of the image processing apparatus 100 transmits not only the received image 403 and the link destination information items 404 and 405, but also a printing object selection screen 409 and a print start button 410 to the PC 205 as the information on the preview screen. Therefore, on the RUI 202, the printing object selection screen 409 and the print start button 410 are also disposed on the preview screen as shown in FIG. 4.

The printing object selection screen 409 has a received image print button 409a, link destination print buttons 409b and 409c, and an all selection button 409d.

The received image print button 409a is a button for setting the received image 403 as an object to be printed in a case where the received image print button 409a is selected by the user, i.e. its check box is checked by the user.

The link destination print button 409b is a button for setting the Web site 407 indicated by the link destination information 404 as an object to be printed in a case where the link destination print button 409b is selected by the user, i.e. its check box is checked by the user.

The link destination print button 409c is a button for setting the Web site 408 indicated by the link destination information 405 as an object to be printed in a case where the link destination print button 409c is selected by the user, i.e. its check box is checked by the user.

The all selection button 409d is a button for selecting all of the received image print button 409a and the link destination print buttons 409b and 409c in a case where the all selection button 409d is selected by the user, i.e. its check box is checked by the user.

When the user clicks the print start button 410 to provide a print instruction, the CPU 103 of the image processing apparatus 100 starts to print the object to be printed. More specifically, in a case where the received image print button 409a on the printing object selection screen 409 has been selected, the CPU 103 of the image processing apparatus 100 executes printing of the received image 403, and a printed sheet 411 of the received image 403 is output.

Further, in a case where the link destination print button 409b has been selected when the user clicks the print start button 410, another window of the Web browser is started, and the screen (Web page 412a) of the Web site 407 indicated by the link destination information 404 is displayed. Further, the printer driver for the image processing apparatus 100 is started in the PC 205, and print data of the Web page 412a is generated and transmitted to the image processing apparatus 100. Upon receipt of this print data, the CPU 103 of the image processing apparatus 100 executes printing of the received print data, and a printed sheet 412 of the Web page 412a is output from the image processing apparatus 100.

Similarly, in a case where the link destination print button 409c has been selected when the user clicks the print start button 410, another window of the Web browser is started, and the screen (Web page 413a) of the Web site 408 indicated by the link destination information 405 is displayed. Further, the printer driver for the image processing apparatus 100 is started in the PC 205, and print data of the Web page 413a is generated and transmitted to the image processing apparatus 100. Upon receipt of this print data, the CPU 103 of the image processing apparatus 100 executes printing of the received print data, and a printed sheet 413 of the Web page 413a is output from the image processing apparatus 100.

In the following description, a sequence of processing by the image processing apparatus 100 for transmitting data related to the screen configuration and the contents of display to the PC 205 connected via the network and displaying the data on the RUI is simply expressed as "displaying the data on the RUI".

Figure 5:
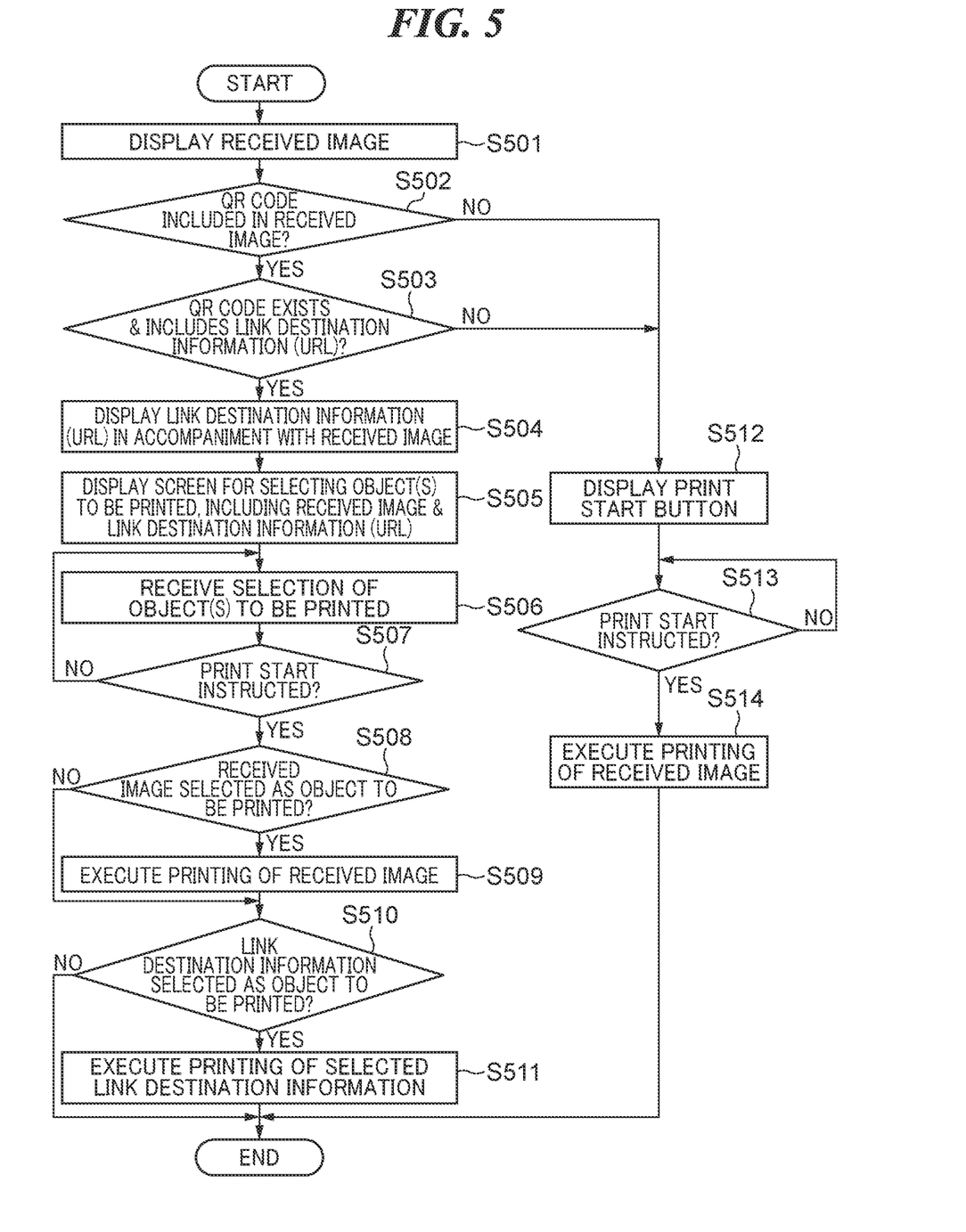
FIG. 5 is a flowchart of a process for selecting an object to be printed and executing printing the object, according to the first embodiment.

FIG. 5 is a flowchart of a process for selecting an object to be printed and executing printing, according to the first embodiment. The present process is executed by the CPU 103 that loads the program of the present process, stored in the ROM 102, into the RAM 104 of the control unit 115.

First, in the image processing apparatus 100, the CPU 103 displays a received image on the RUI 202 (step S501: operation of a display unit). Next, the CPU 103 determines (detects) whether or not a QR code is included in the received image (step S502). If no QR code is included in the received image (NO to the step S502), the process proceeds to a step S512. On the other hand, if a QR code is included in the received image (YES to the step S502), the process proceeds to a step S503.

The case where the answer to the question of the step S502 is affirmative (YES) will be described with reference to the illustrated example in FIG. 4. If the QR codes 403a and 403b are detected from the received image 403 (YES to the step S502), the CPU 103 analyzes the detected QR codes 403a and 403b and determines whether or not link destination information is included in each QR code (step S503: operation of an extraction unit). If link destination information is included (YES to the step S503), the CPU 103 displays the link destination information items 404 and 405, included in the QR codes, respectively, on the RUI 202 as shown in FIG. 4 in accompaniment with the received image 403 (step S504). Although FIG. 4 shows the case where the two QR codes (403a and 403b) are included in the received image, by way of example, it is only required that all QR codes in the received image are detected, and the link destination information included in each QR code is displayed in the step S504.

Next, in the image processing apparatus 100, the CPU 103 displays the printing object selection screen 409 (operation of a printing object reception unit) and the print start button 410 (operation of a print instruction reception unit) on the RUI 202 (step S505). Then, the CPU 103 waits for reception of user's selection of an object to be printed (step S506) and a user's operation of clicking the print start button 410 (print start instruction) (step S507). When a print start instruction is received (YES to the step S507), the process proceeds to a step S508.

In the step S508, the CPU 103 determines whether or not the received image 403 has been selected as the object to be printed (whether or not the received image print button 409a on the printing object selection screen 409 has been checked) (operation of a print control unit). If the received image 403 has been selected as the object to be printed (YES to the step S508), the CPU 103 executes printing of the received image 403 (step S509: operation of a first print unit). Further, the CPU 103 determines whether or not the link destination information has also been selected as the object to be printed (whether or not at least one of the link destination print buttons 409b and 409c on the printing object selection screen 409 has been checked) (step S510). If the link destination information has been selected as the object to be printed (YES to the step S510), the CPU 103 executes printing of the selected link destination information (step S511: operation of a second print unit), followed by terminating the present process.

If no QR code has been detected from the received image (NO to the step S502), or if no link destination information is included in the detected QR code (NO to the step S503), the process proceeds to the step S512.

In the step S512, in the image processing apparatus 100, the CPU 103 displays the print start button 410 on the RUI 202. After that, the CPU 103 waits for an operation of clicking the print start button 410 (print start instruction) (step S513). When a print start instruction is received (YES to the step S513), the CPU 103 executes printing of the received image (step S514), followed by terminating the present process.

Next, a second embodiment will be described.

In the present embodiment, the same components as those described with reference to FIGS. 1, 2, and 4 are denoted by the same reference numerals, and redundant description is omitted.

Figure 6:
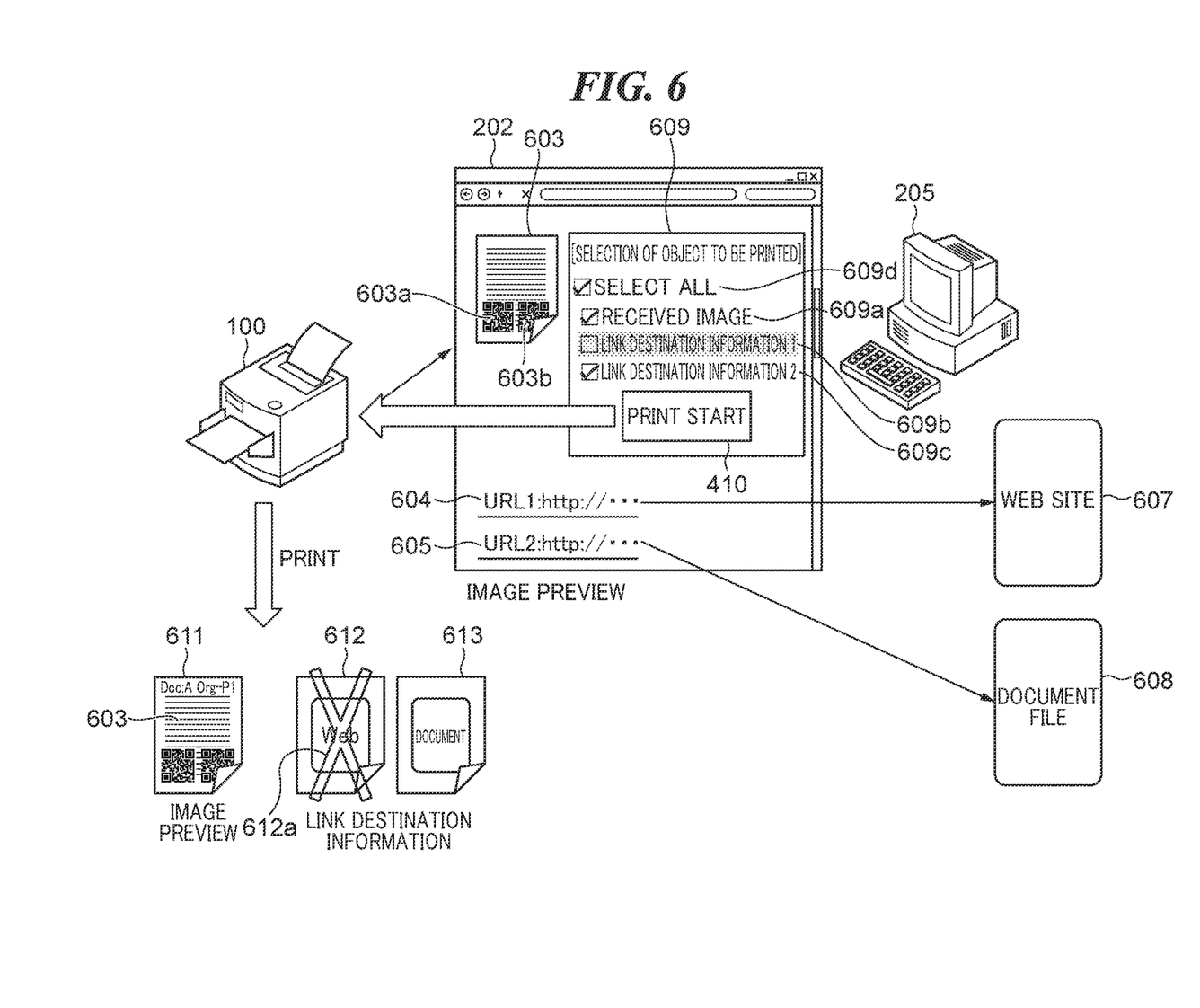
FIG. 6 is a diagram useful in explaining a preview screen according to a second embodiment of the present invention, which is displayed on the RUI of the image processing apparatus.

FIG. 6 is a diagram useful in explaining a preview screen according to the present embodiment, which is displayed on the RUI 202 of the image processing apparatus 100. The following description will be given of a case where the image received by the image processing apparatus 100 is a received image 603.

Similar to the received image 403 (see FIG. 4), the number of QR codes included in the received image 603 is two (QR codes 603a and 603b), and hence a printing object selection screen 609 having the same configuration as the printing object selection screen 409 and the print start button 410 are arranged on the RUI 202. Here, the number of QR codes included in the received image 603 can be a number other than two, but in this case, a link destination print button corresponding to each QR code included in the received image 603 is displayed on the printing object selection screen 609.

The CPU 103 of the image processing apparatus 100 analyzes the QR codes 603a and 603b in the received image 603 and extracts link destination information 604 and link destination information 605 from the QR codes 603a and 603b, respectively. The information indicated by the link destination information 604 (second link destination information) is a normal We site 607, but the information indicated by the link destination information 605 (first link destination information) is a document file 608 (such as a PDF file). In a case where a document file is included in the extracted link destination information as in the received image 603, there is a high possibility that the user selects only this file having been formatted for printing as the object to be printed. In view of this, the CPU 103 performs control to prevent the Web site 607 indicated by the link destination information 604 from being selected by the user as the object to be printed but enable the user to select the document file 608 indicated by the link destination information 605 as the object to be printed. For example, on the printing object selection screen 609, a link destination print button 609b for selecting the Web site 607 as the object to be printed is grayed out to disable the operation of selecting this button. Further, in a case where the user selects an all selection button 609d, the screen display is controlled such that the link destination print button 609b is also prevented from being selected, and only a received image print button 609a and a link destination print button 609c are selected.

Further, in a case where the user clicks the print start button 410, after selecting the all selection button 609d, since the link destination print button 609b is prevented from being selected, a printed sheet 612 of the screen (Web page 612a) of the Web site 607 is not output from the image processing apparatus 100. That is, only a printed sheet 611 of the received image 603 and a printed sheet 613 of the document file 608 indicated by the link destination information 605 are output.

Figure 7:
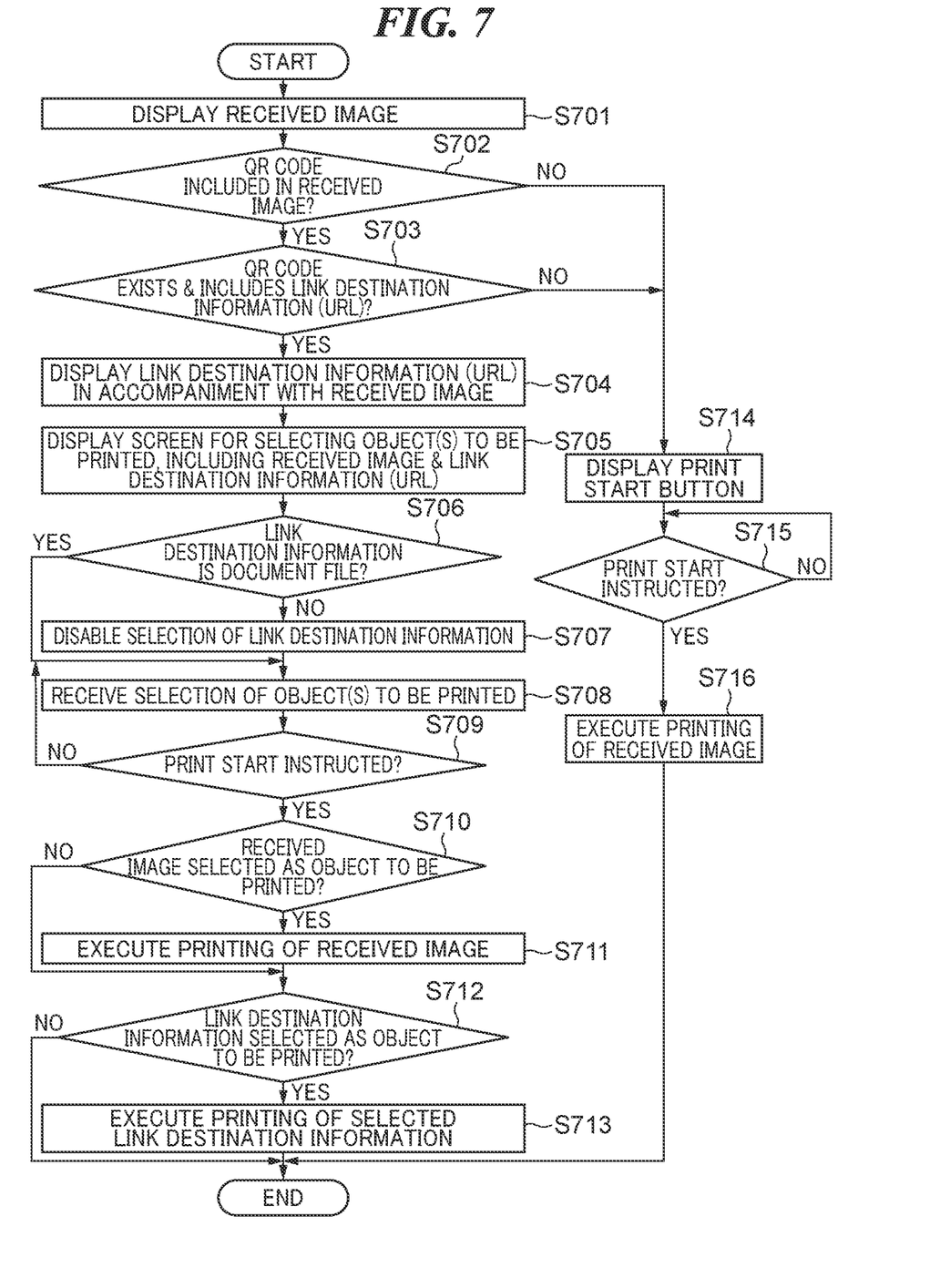
FIG. 7 is a flowchart of a process for selecting an object to be printed and executing printing of the object, according to the second embodiment.

FIG. 7 is a flowchart of a process for selecting an object to be printed and executing printing, according to the present embodiment.

First, in steps S701 to S705, the same processing operations as the steps S501 to S505 in FIG. 5 are executed. Note that the following description will be given of a case where the received image displayed on the RUI 202 in the step S701 is the received image 603.

Next, in the image processing apparatus 100, the CPU 103 sequentially determines, with respect to the link destination print buttons 609b and 609c displayed in the step S705, whether or not the information indicated by the link destination information associated with each button is a document file (step S706). If the information is not a document file (such as information in the PDF format) (NO to the step S706), the CPU 103 performs control to gray out the associated link destination print button to disable the operation of selecting this button (step S707: operation of a selection control unit), and the process proceeds to a step S708. For example, the information indicated by the link destination information 604 associated with the link destination print button 609b indicates not a document file but the Web site 607, and hence the link destination print button 609b is grayed out as shown in FIG. 6. On the other hand, if the information is a document file (such as information in the PDF format) (YES to the step S706), the process directly proceeds to the step S708.

After that, in the step S708 and steps S709 to S716, the same processing operations as in the steps S506 to S514 in FIG. 5 are executed, followed by terminating the present process.

Next, a description will be given of a third embodiment in which control is performed for associating a plurality of printed sheets with each other, which are selected on the printing object selection screen (409 or 609) as the objects to be printed and are printed by the image processing apparatus 100.

Note that the same components as those described with reference to FIGS. 1, 2, and 4 are denoted by the same reference numerals, and redundant description is omitted.

Figure 8A:
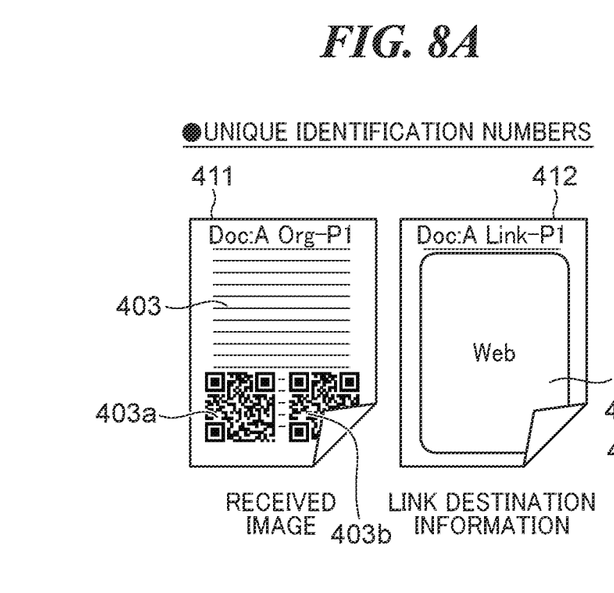
FIGS. 8A to 8C are diagrams useful in explaining association control in a third embodiment of the present invention, for associating printed sheets of a plurality of objects to be printed which are selected on a printing object selection screen.
Figure 8B:
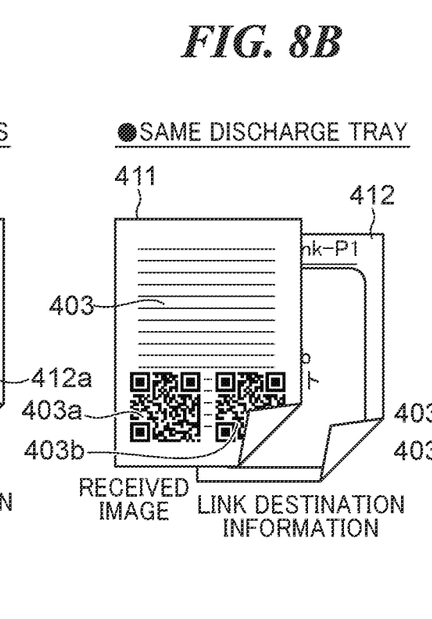
Figure 8C:
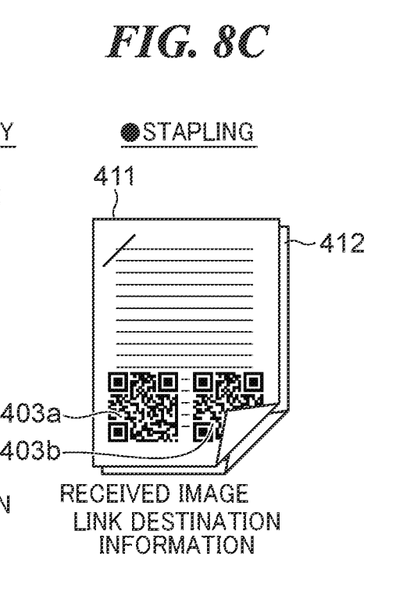

FIGS. 8A to 8C are diagrams useful in explaining the association control in the present embodiment, for associating with each other printed sheets of a plurality of objects to be printed which are selected on the printing object selection screen.

As shown in FIG. 3, also in the conventional technique, the image processing apparatus 100 can output, with respect to the received image 203, not only the printed sheet 309 of the received image 203, but also the printed sheet 310 of the Web page 310a specified by the QR code included in the received image 203. Further, in the conventional preview function, the received image 203 and the link destination information 204 in accompaniment therewith are displayed on the preview screen, and the correspondence between them is also clearly indicated. However, there is no information indicating the correspondence between the printed sheet 309 of the received image 203 and the printed sheet 310 of the Web page 310a indicated by the link destination information 204, which have been separately printed. Further, the printed sheets 309 and 310 can be different e.g. in the sheet setting, the output timing, the discharge tray, and so forth, which causes a problem that when acquiring the printed sheets 309 and 310 from the image processing apparatus 100, the user cannot see the correspondence between these printed sheets.

To solve this problem, in the present embodiment, the association control is performed with respect to such printed sheets.

The association control in the present embodiment will be described taking a case where the preview screen including the received image 403, the link destination information 404 and 405, the printing object selection screen 409, and the print start button 410 is displayed on the RUI 202, as shown in FIG. 4, by way of example. More specifically, the following description will be given of the association control performed in a case where the user selects the received image print button 409a and the link destination print button 409b, and then presses the print start button 410. That is, in the present embodiment, the control to associate the printed sheet 411 of the received image 403 and the printed sheet 412 of the Web page 412a indicated by the link destination information 404 will be described.

There are three methods for the association control. The first method is a method of printing a unique identification number on each of the printed sheets 411 and 412, the second method is a method of outputting the printed sheets 411 and 412 to the same sheet discharge tray, and the third method is a method of stapling the printed sheets 411 and 412 as one document. As the association control performed with respect to the printed sheets 411 and 412, one or a plurality of methods of these can be applied.

In a case where the first method is applied, the CPU 103 (identification number-printing unit) of the image processing apparatus 100 prints a unique identification number in a margin area of each of the printed sheets 411 and 412 as shown in FIG. 8A. The unique identification number is formed e.g. by a document name, an identification name for identifying whether the included image is a received image itself or a Web page indicated by the link destination information included in the received image, and the number of pages. For example, on the printed sheet 411, its unique identification number "DOC: A Org-P1" is printed. With this, the user can see that the printed sheet 411 has the document name "A", the included image is the received image itself based on the identification name "Org", and the number of pages is "P1".

In a case where the second method is applied, the CPU 103 (print setting control unit) of the image processing apparatus 100 sets the same sheet discharge tray setting in the respective print settings for the printed sheets 411 and 412 and executes printing. Further, to continuously print the printed sheets 411 and 412, the same sheet setting (such as A4-sheet) may be set for the printed sheets 411 and 412. By setting such print settings as described above, the printed sheets 411 and 412 are continuously output to the same sheet discharge tray as shown in FIG. 8B.

In a case where the third method is applied, in addition to the second method, the CPU 103 (stapling control unit) of the image processing apparatus 100 performs stapling of the printed sheets 411 and 412 as one document. As a result, the printed sheets 411 and 412 are output in a state bound in one by a staple.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processor or circuit can include a central processing unit (CPU), a micro processing unit (MPU), a graphics processing unit (GPU), an application specific integrated circuit (ASIC), and a field programmable gate array (FPGA). Further, the processor or circuit can include a digital signal processor (DSP), a data flow processor (DFP), or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140846 filed Sep. 5, 2022, which is hereby incorporated by reference herein in its entirety.

What is claimed is:

1. An image processing apparatus that performs image processing of document data including link destination information converted to a code data image, comprising:
   a printer that prints the document data and information indicated by the link destination information;
   a display that displays the document data;
   a controller that extracts, in a case where the code data image is detected from the document data, link destination information from the detected code data image; and
   a user interface that receives a user selection on whether or not to set each of the document data and the information indicated by the link destination information as an object to be printed and that further receives a print instruction for printing the object to be printed from a user,
   wherein the controller causes, when the print instruction is received, the printer to print the document data in a case where the document data has been selected by the user as the object to be printed, and causes the printer to print the information indicated by the link destination information in a case where the information indicated by the link destination information has been selected by the user as the object to be printed, and
   wherein the controller inhibits, in a case where first and second link destination information items are extracted by the controller, and information indicated by the first link destination information is a document file and information indicated by the second link destination information is not a document file, the user interface from receiving a user selection of the second link destination information.

2. The image processing apparatus according to claim 1, wherein the document data is generated or acquired from outside the image processing apparatus.

3. The image processing apparatus according to claim 1, wherein the controller causes the printer to print, in a case where the document data and the information indicated by the link destination information are to be printed by the printer, unique identification numbers on printed sheets to be output by printing performed by the printer.

4. The image processing apparatus according to claim 1, wherein the controller sets, in a case where the document data and the information indicated by the link destination information are to be printed by the printer, the same setting for at least one of a sheet discharge tray and a sheet setting of print settings set for the printer.

5. The image processing apparatus according to claim 1, wherein the controller performs control to output, in a case where the document data and the information indicated by the link destination information are to be printed by the printer, printed sheets output by printing performed by the printer, in a state bound into one by stapling.

6. A method of controlling an image processing apparatus that performs image processing of document data including link destination information converted to a code data image, comprising:

displaying the document data;

extracting, in a case where the code data image is detected from the document data, link destination information from the detected code data image;

receiving, by a user interface of the image processing apparatus, a user selection on whether or not to set each of the document data and the information indicated by the link destination information as an object to be printed;

receiving, by the user interface, a print instruction for printing the object to be printed from a user;

printing, when the print instruction is received, the document data in a case where the document data has been selected by the user as the object to be printed, and printing the information indicated by the link destination information in a case where the information indicated by the link destination information has been selected by the user as the object to be printed; and inhibiting, in a case where first and second link destination information items are extracted from the detected code data image in the extracting, and information indicated by the first link destination information is a document file and information indicated by the second link destination information is not a document file, the user interface from receiving user selection of the second link destination information.

7. A non-transitory computer-readable storage medium storing a program for causing a computer to execute a method of controlling an image processing apparatus that performs image processing of document data including link destination information converted to a code data image, wherein the method comprises:

displaying the document data;

extracting, in a case where the code data image is detected from the document data, link destination information from the detected code data image;

receiving, by a user interface of the image processing apparatus, a user selection on whether or not to set each of the document data and the information indicated by the link destination information as an object to be printed;

receiving, by the user interface, a print instruction for printing the object to be printed from a user;

printing, when the print instruction is received, the document data in a case where the document data has been selected by the user as the object to be printed, and printing the information indicated by the link destination information in a case where the information indicated by the link destination information has been selected by the user as the object to be printed; and inhibiting, in a case where first and second link destination information items are extracted from the detected code data image in the extracting, and information indicated by the first link destination information is a document file and information indicated by the second link destination information is not a document file, the user interface from receiving user selection of the second link destination information.

* * * * *